(12) United States Patent
Mack et al.

(10) Patent No.: US 6,840,890 B2
(45) Date of Patent: Jan. 11, 2005

(54) CLUTCH CALIBRATION AND CONTROL

(75) Inventors: William Joseph Mack, Kalamazoo, MI (US); Donald Speranza, Kalamazoo, MI (US); Anthony Stasik, Coppull (GB); Kwok Wah Chan, Manchester (GB); Jeffrey Philip Hawarden, Rossendale (GB); Robert Stanley Wheeler, Preston (GB); Timothy Peter Kelly, Lymm (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/320,793

(22) Filed: Dec. 16, 2002

(65) Prior Publication Data

US 2003/0087726 A1 May 8, 2003

Related U.S. Application Data

(63) Continuation of application No. 09/870,309, filed on May 30, 2001, now Pat. No. 6,494,810.

(51) Int. Cl.[7] .............................................. B60K 41/02
(52) U.S. Cl. ...................................... 477/174; 477/180
(58) Field of Search ............................... 477/166, 174, 477/180, 902

(56) References Cited

U.S. PATENT DOCUMENTS

| | | |
|---|---|---|
| 3,886,817 A | 6/1975 | Paul et al. |
| 4,792,027 A | 12/1988 | Ohkumo |
| 4,969,545 A | 11/1990 | Hayashi |
| 5,067,599 A | 11/1991 | Röder et al. |
| 5,393,274 A | 2/1995 | Smedley |
| 5,411,124 A | 5/1995 | Olson |
| 5,624,350 A | 4/1997 | Bates |
| 5,632,706 A | 5/1997 | Kremmling et al. |
| 5,662,553 A | 9/1997 | Reichlinger |
| 5,871,419 A | 2/1999 | Amendt |
| 5,980,428 A | 11/1999 | Liu |
| 6,022,295 A | 2/2000 | Liu |
| 6,023,988 A | 2/2000 | McKee et al. |
| 6,071,211 A | 6/2000 | Liu et al. |
| 6,086,514 A | 7/2000 | Jones et al. |
| 6,167,996 B1 | 1/2001 | Huber et al. |
| 6,309,325 B1 | 10/2001 | Baer et al. |

OTHER PUBLICATIONS

EP Search Report dated Aug. 12, 2002, #02011342.9–2421.
English Abstract of EP1063440–A2 dated Dec. 27, 2000.

*Primary Examiner*—Dirk Wright
(74) *Attorney, Agent, or Firm*—Rader, Fishman & Grauer PLLC

(57) ABSTRACT

A control system and calibration method are provided for a vehicle drive line having an automated master friction clutch. The control system utilizes engine torque data supplied by a serial communication data link to identify a clutch control parameter value corresponding to an urge-to-move position of the clutch. The clutch control parameter value identified by the calibration method is stored and utilized by the control system to control the engagement position of the automated clutch in an "urge to move" mode of operation. The inventive calibration method can be utilized across multiple vehicle platforms having different engine, clutch and transmission system components.

10 Claims, 6 Drawing Sheets

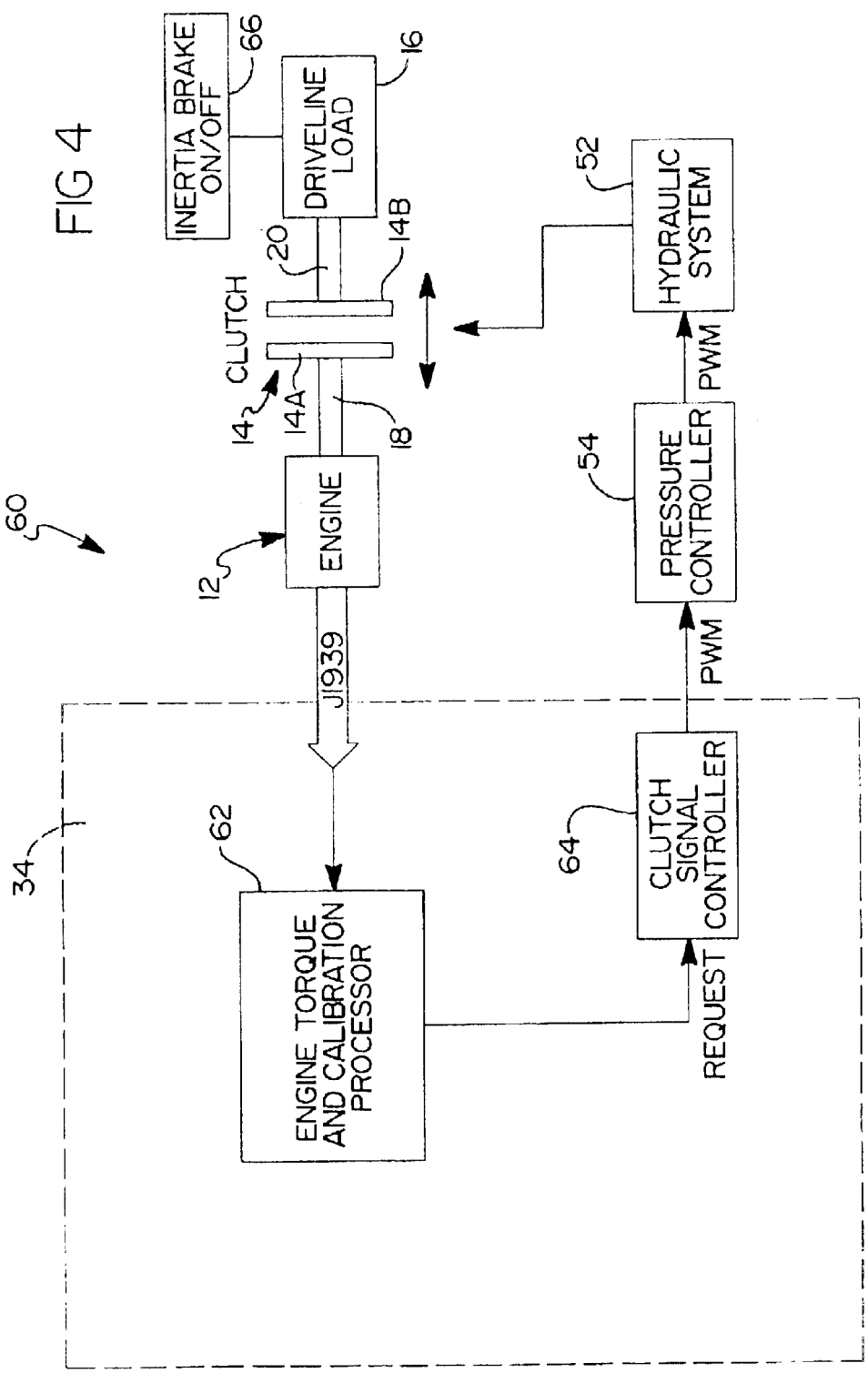

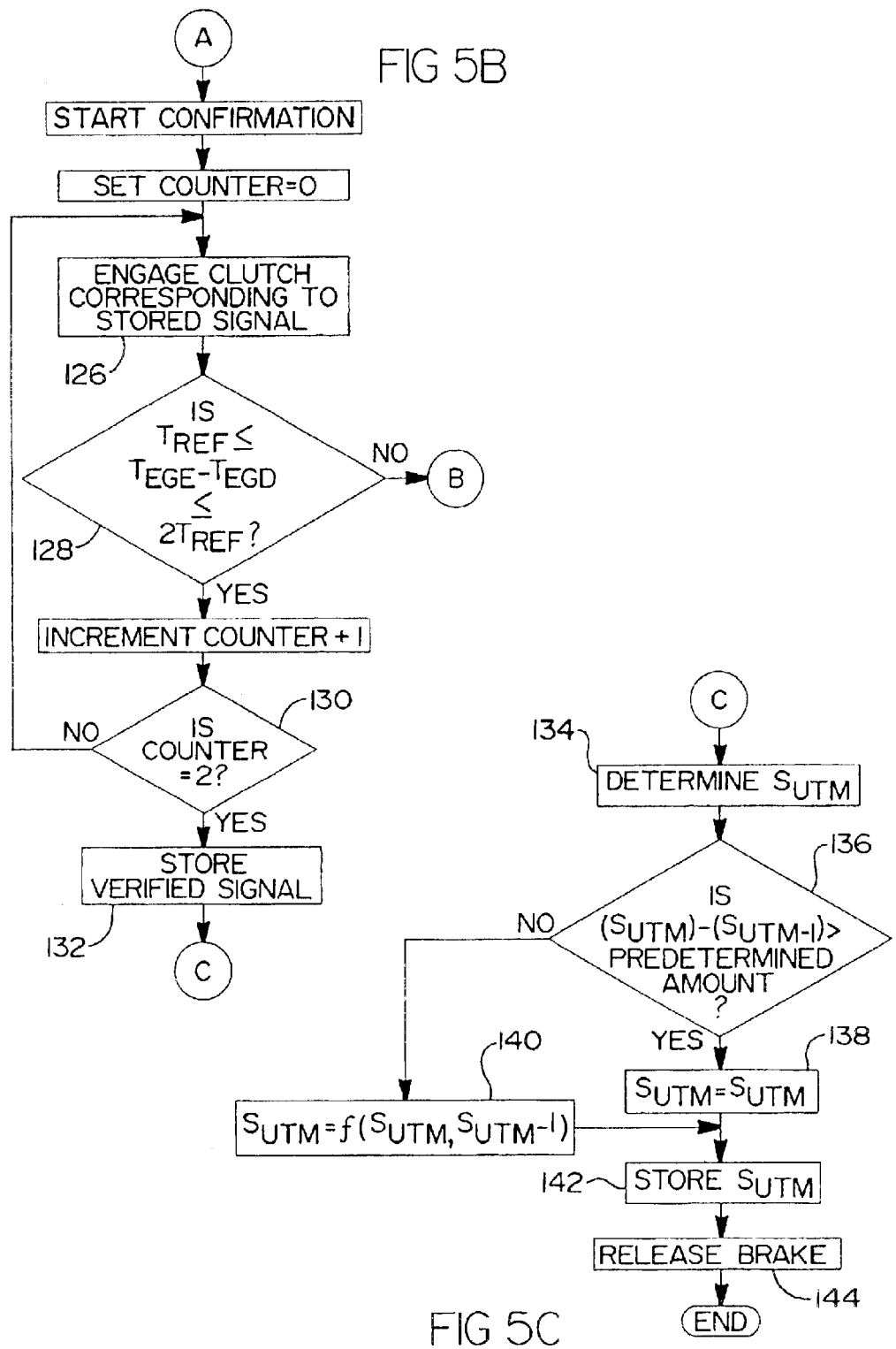

CLUTCH CALIBRATION AND CONTROL

This application is a continuation of U.S. application Ser. No. 09/870,309 entitled "CLUTCH CALIBRATION AND CONTROL" filed May 30, 2001, now U.S. Pat. No. 6,494,810 issued on Dec. 17, 2002, the disclosures of which are all incorporated herein by reference.

FIELD OF THE INVENTION

The present invention relates to controls for vehicular master clutches, preferably wet friction clutches, utilized in partially or fully automated mechanical transmission systems. In particular, the present invention relates to an urge-to-move point calibration method/system utilizing an electronic data link.

BACKGROUND OF THE INVENTION

Partially and fully automated vehicular mechanical transmission systems utilizing automated friction master clutches are known in the art. These systems are typically employed in a vehicle that includes an engine, a multi-speed transmission having an input shaft brake and at least one traction wheel connected to an output of the transmission. At engine idle speeds with the transmission engaged in a low ratio, such as first gear, it is desirable that the engine generate at the flywheel a small amount of torque sufficient to cause slow or creeping movement of the vehicle if the vehicle brakes are not applied. This mode of operation is analogous to conditions experienced by drivers of passenger automobiles equipped with torque converter-type transmissions. The advantages of this "urge-to-move" feature in an automatic friction master clutch control is that the vehicle will feel and act like a familiar passenger car equipped with an automatic transmission, the vehicle may be maneuvered at slow speeds using the brake pedal only, and vehicle launches will be quicker with less lurch. The amount of flywheel or output torque generated by an engine at idle speed, and transferable by a clutch in the "urge-to-move" engagement condition, should be sufficient to allow creeping if the brakes are not applied but small enough to allow the clutch to dissipate the heat energy developed when the clutch is slipped due to application of the vehicle brakes.

A key feature of known automated friction clutch controls is their ability to sense and control engine flywheel torque utilizing an electronically controlled engine connected to a serial communication data link, such as a data link conforming to SAE J1939, and to control the engaged position of a master friction clutch. To improve the controllability and response of prior art master clutch control systems, it is known to determine a clutch control parameter, such as a pulse width modulation (PWM) signal, which corresponds to a clutch touch point position, i.e. the point of initial clutch engagement. However, conventional friction clutch control systems are not necessarily configured to determine a clutch control parameter corresponding to the urge-to-move position of the clutch. Moreover, conventional friction clutch control systems for determining the touch point position are typically designed for a specific vehicle platform rendering the control system inflexible and uneconomical for inclusion in other vehicle platforms having different engine, clutch and transmission system components.

SUMMARY OF THE INVENTION

The present invention provides an innovative calibration system/method for an automated master friction clutch, such as a wet friction clutch, which utilizes information available on serial communication data links, such as data links conforming to the SAE J1939, to determine the value of a clutch control parameter corresponding to the urge-to-move position of the master friction clutch.

The inventive control system includes an electronic control unit (ECU) that receives torque information from an engine via a serial communication data link and processes the same according to control logic. The ECU communicates with a clutch controller, which is configured to control the engagement of the clutch.

The clutch operating parameter value corresponding to the clutch urge-to-move position is determined by a calibration routine that is executed according to a predetermined schedule. Upon determination that the vehicle conditions are safe to begin calibration, the control system determines an approximation of the clutch control parameter value by engaging the clutch until a maximum loaded engine torque sensed during the engagement of the clutch minus an unloaded engine torque exceeds an urge-to-move reference torque. Due to the limited system response, the initial engagement of the clutch will likely yield an approximation of the clutch control parameter value higher than the actual control parameter value (clutch over-engaged). The clutch is then returned to the fully disengaged position and a more detailed search is commenced. The detailed search is characterized by re-applying the clutch in at least one pulse, where the pulse comprises applying the clutch to a position corresponding to a clutch control parameter value, pausing a predetermined time to allow the engine and clutch to stabilize, and then releasing the clutch. The cycle of applying and releasing the clutch is continued until a more accurate control parameter value is determined. The control system then verifies the accuracy of the control parameter value and stores this value in computer memory.

In order to account for inaccuracies in engine torque reporting, the control system subtracts a predetermined offset constant from the verified control parameter value to arrive at a control parameter value that corresponds to the urge-to-move position of the clutch actuator. In most cases the urge-to-move control parameter value is already established from previous operation of the vehicle and stored in computer memory. Due to factors such as clutch wear and temperature changes, the urge-to-move control parameter value can change, and therefore is updated each calibration. The new urge-to-move control parameter value may be used as the updated urge-to-move control parameter value, or a blend of the stored and the new values may be used to determine the updated urge-to-move control parameter value.

The calibration system/method advantageously compensates for variations in system components across multiple vehicle platforms to determine a clutch control parameter value corresponding to the urge-to-move position of the clutch. Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 4 is a schematic illustration of the inventive control system.

FIGS. 5A, 5B and 5C are flow charts illustrating the inventive control logic.

DESCRIPTION OF THE PREFERRED EMBODIMENT

Figure 1:
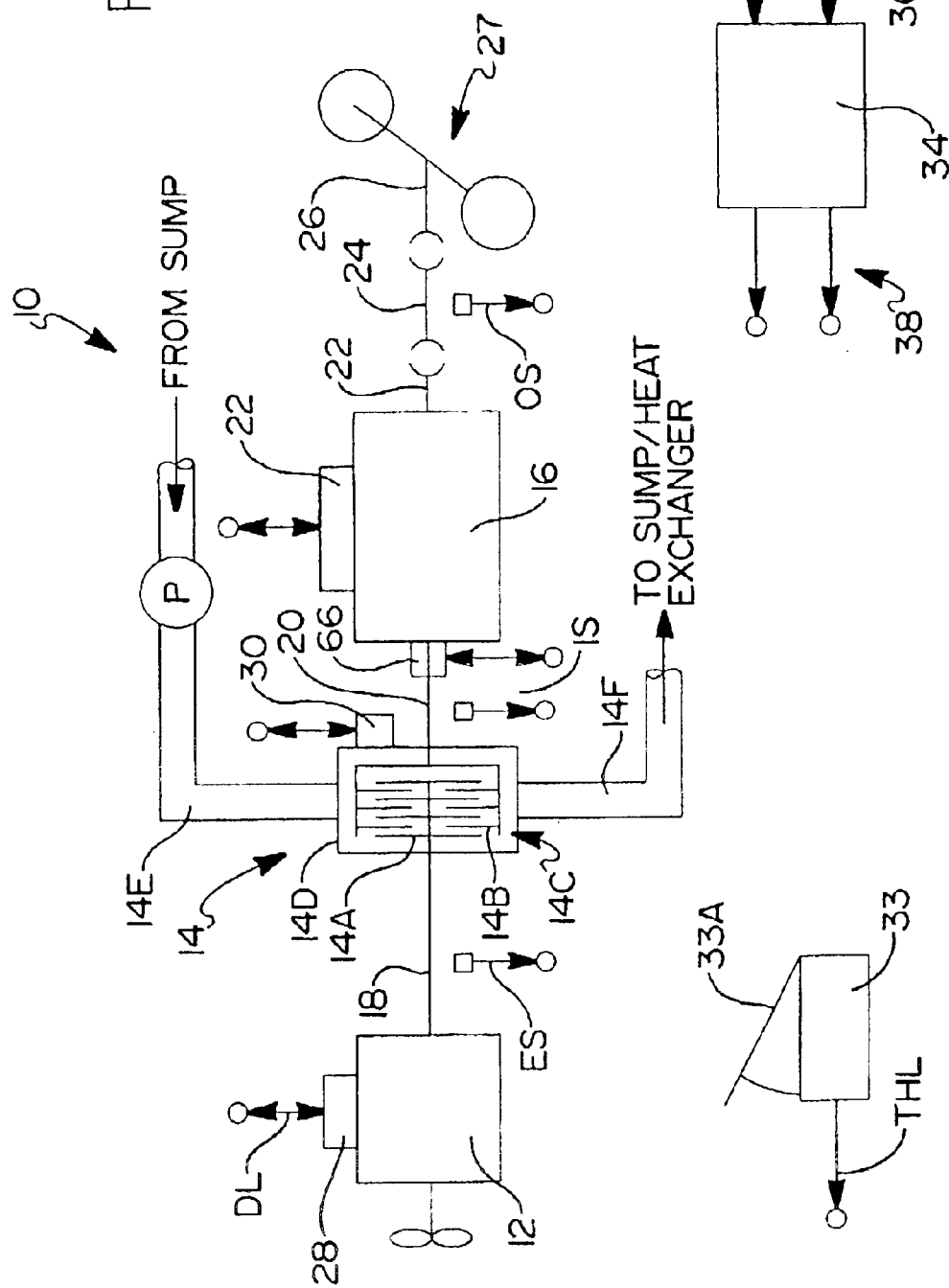
FIG. 1 is a schematic illustration of a vehicular automated mechanical transmission system advantageously utilizing the control method/system of the present invention.

A typical vehicular automated mechanical transmission system 10 advantageously utilizing the master clutch control of the present invention is schematically illustrated in FIG. 1. System 10 includes a fuel-controlled engine 12, a wet master friction clutch 14 and a multiple-speed mechanical transmission 16. Engine 12 is typically a diesel or gasoline engine and has an output member or crank shaft 18 that drives friction discs 14A of clutch 14, which are interdigitated with friction discs 14B that are rotationally fixed to input shaft 20 of transmission 16. Transmission 16 may be of the simple or compound type, having an output shaft 22, which drives a drive shaft 24 connected to the input 26 of a vehicle drive axle mechanism 27.

An engine controller 28, which is preferably electronically and microprocessor-controlled, is provided for controlling fuel delivery to the engine and for providing output information to an electronic data link DL, preferably conforming to the industry standard SAE J1939 or a comparable protocol. A data link, conforming to the SAE J1939 protocol or a comparable protocol, transmits information by which engine output torque (also called "flywheel torque") may be read or determined. By utilizing this information and engine control capability, the master clutch 14 may be controlled to provide enhanced system performance. A sensor 33 is preferably provided for sensing throttle 33A position and providing a signal THL to engine controller 28 indicative thereof. However, it is recognized that throttle position information also may be obtained from the data link.

A microprocessor-based electronic control unit 34 (ECU) is provided for receiving input signals 36 and processing the same according to control logic to generate command output signals 38. The ECU 34 may be separate or integral with the engine controller 28. Although not shown in FIG. 1, ECU 34 may be of general construction having a central processing unit (CPU), various co-processors, a read only memory (ROM), a random access memory (RAM), an input for selectively receiving engine torque data via a data link, an output for selectively transmitting command output signals 38, and a bi-directional bus interconnecting the components.

Clutch 14 is defined as a "wet clutch," as the friction members thereof, 14A and 14B, are exposed to liquid, such as Dextron III, for heat transfer and/or lubrication purposes. In the illustrated embodiment, the clutch pack 14C is contained within a housing 14D, which is connected to source conduit 14E and an exhaust conduit 14F. While a forced coolant system is illustrated, the present invention also is applicable to wet clutches wherein the friction members are in a relatively static sump or the like. While the illustrated preferred embodiment utilizes a multi-disc wet clutch 14, the present invention also is applicable to single-disc wet clutches and/or dry clutches.

Figure 2:
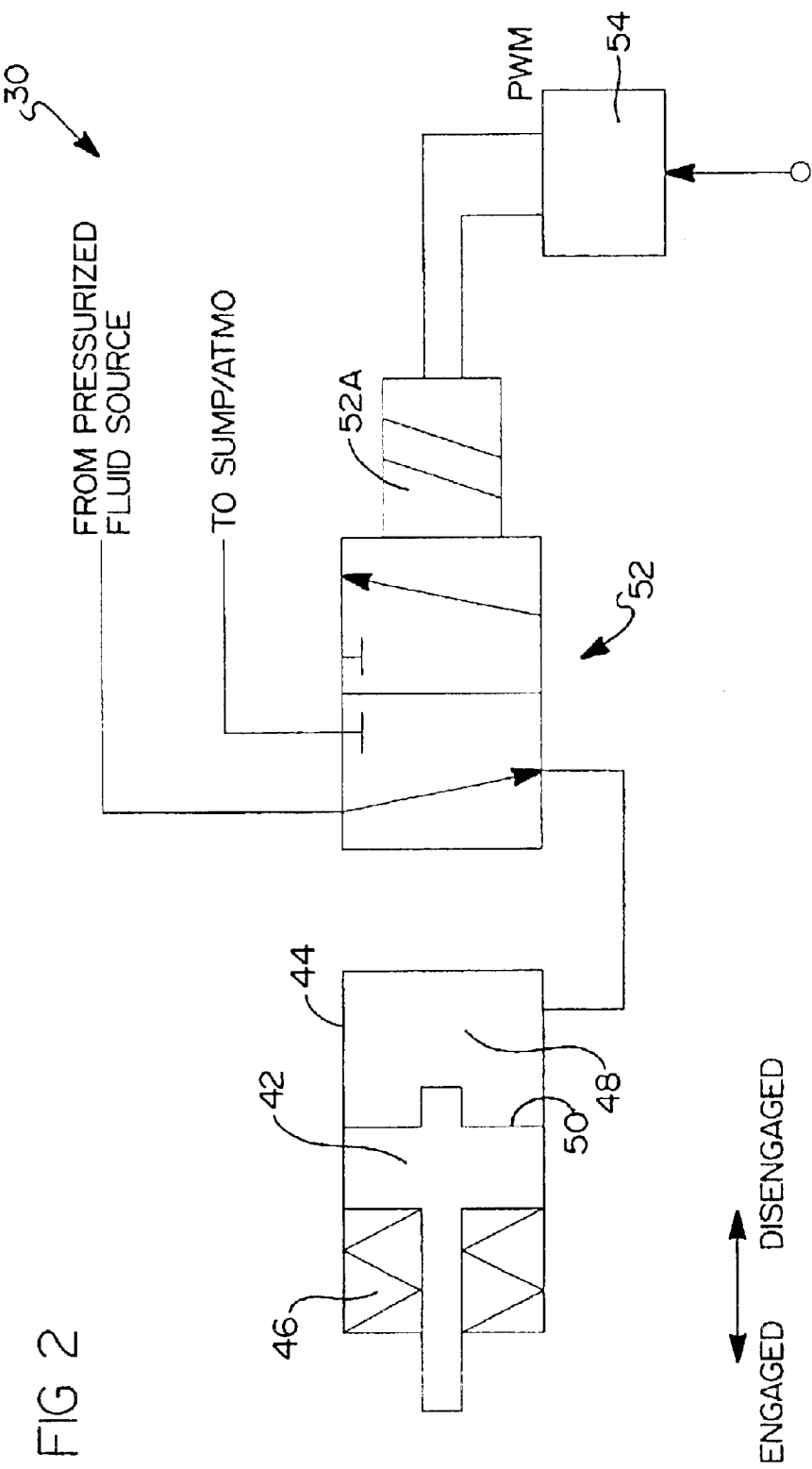
FIG. 2 is a schematic illustration of a pressurized fluid-actuated control mechanism for controlling the engaged condition of a vehicular master clutch.

A fluid pressure-operated clutch actuator assembly 30 is schematically illustrated in FIG. 2. A clutch operator piston 42 is received in a cylinder 44 and is biased in the disengaging direction by springs 46. Pressurized fluid, such as a hydraulic fluid or pressurized air, introduced into chamber 48 will act on piston face 50 to move the piston 42 in the engaged direction against the bias of the springs. A two-position, three-way, solenoid-controlled valve 52 is provided to selectively pressurize and exhaust chamber 48. A pressure controller 54, having an input for selectively receiving command signals from ECU 34, controls the energizing of the solenoid 52A of valve 52, preferably by pulse width modulation (PWM). Although a pressurized fluid-type actuator assembly 30 is illustrated, the present invention is also applicable to clutch controls using other types of clutch actuators, such as ball ramp actuators or the like.

Figure 3:
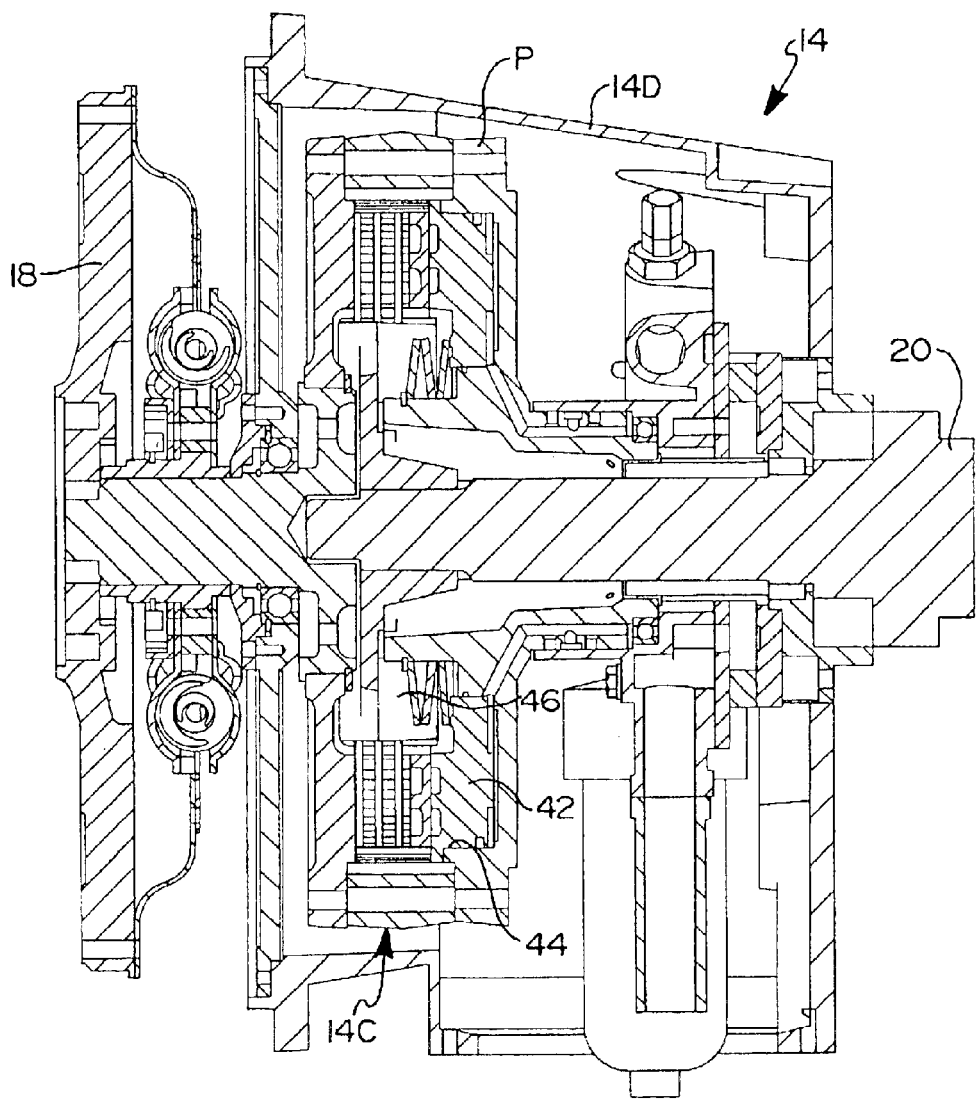
FIG. 3 is a partial sectional view of a vehicular wet master friction clutch of the type utilized in the system of FIG. 1.

The structure of a typical wet master friction clutch 14 may be seen by reference to FIG. 3. Briefly, the engine output 18, shown as a dampened flywheel, is connected to the transmission input shaft 20 by an engageable and dis-engageable friction disc pack 14C. The clutch is contained within a housing 14D, which will hold the lubricating and cooling fluid, such as Dextron III or the like. Annular piston 42 is slidably and sealingly contained in a cylinder 44 and is biased in the disengaged direction by springs 46.

FIG. 4 is a schematic illustration depicting the inventive control system 60 used to calibrate the urge-to-move position of clutch 14. The ECU 34 includes an engine torque and calibration processor 62 that processes engine torque data received from engine 12 via a serial communications data link. During operation, engine 12 will periodically broadcast an engine configuration map via the serial communications data link. A typical engine configuration map contains engine torque data corresponding to various engine speeds, where the engine speed is typically characterized in revolutions per minute (RPM) and the torque is characterized as a percentage (%) of a rated engine reference torque. The engine reference torque is typically specified and programmed into the electronics of engine 12 by the engine manufacturer and is typically, but not necessarily, the rated maximum engine torque. The engine torque and calibration processor 62 processes the engine torque data according to the stored control logic and communicates with pressure controller 54 via a clutch operating signal controller 64, which is preferably an element of ECU 34. Control system 60 further includes an inertia brake 66 that is configured to slow down or stop the rotation of input shaft 20 so that the engine may be loaded during the calibration process.

As is well known, engine output or flywheel torque ($T_{FW}$) is equal to gross engine torque ($T_{EG}$) minus the sum of engine torque losses ($T_L$), such as engine friction torque, accessory torque, etc. The value of the sum of engine torque losses, at idle speed, may be determined by measuring the value of engine gross torque when the clutch is fully disengaged (therefore, flywheel torque equals zero) and engine speed is stabilized at idle speed ($T_{EGD}=T_L$ if $T_{FW}=0$). With a known value of torque losses ($T_L$) at idle speed, the value of output torque while the clutch is engaged, at a stabilized idle speed, will equal the value of gross engine torque minus the known value of torque losses ($T_{FW}=T_{EGE}-T_L$).

According to the present invention, a calibration method is provided for identifying a clutch control parameter value (such as the value of a pulse width modulated control signal) indicative of the urge-to-move position of the clutch, where the urge-to-move position is the partially engaged position of the clutch that allows creeping of the vehicle if the brakes are not applied.

Figure 5A:
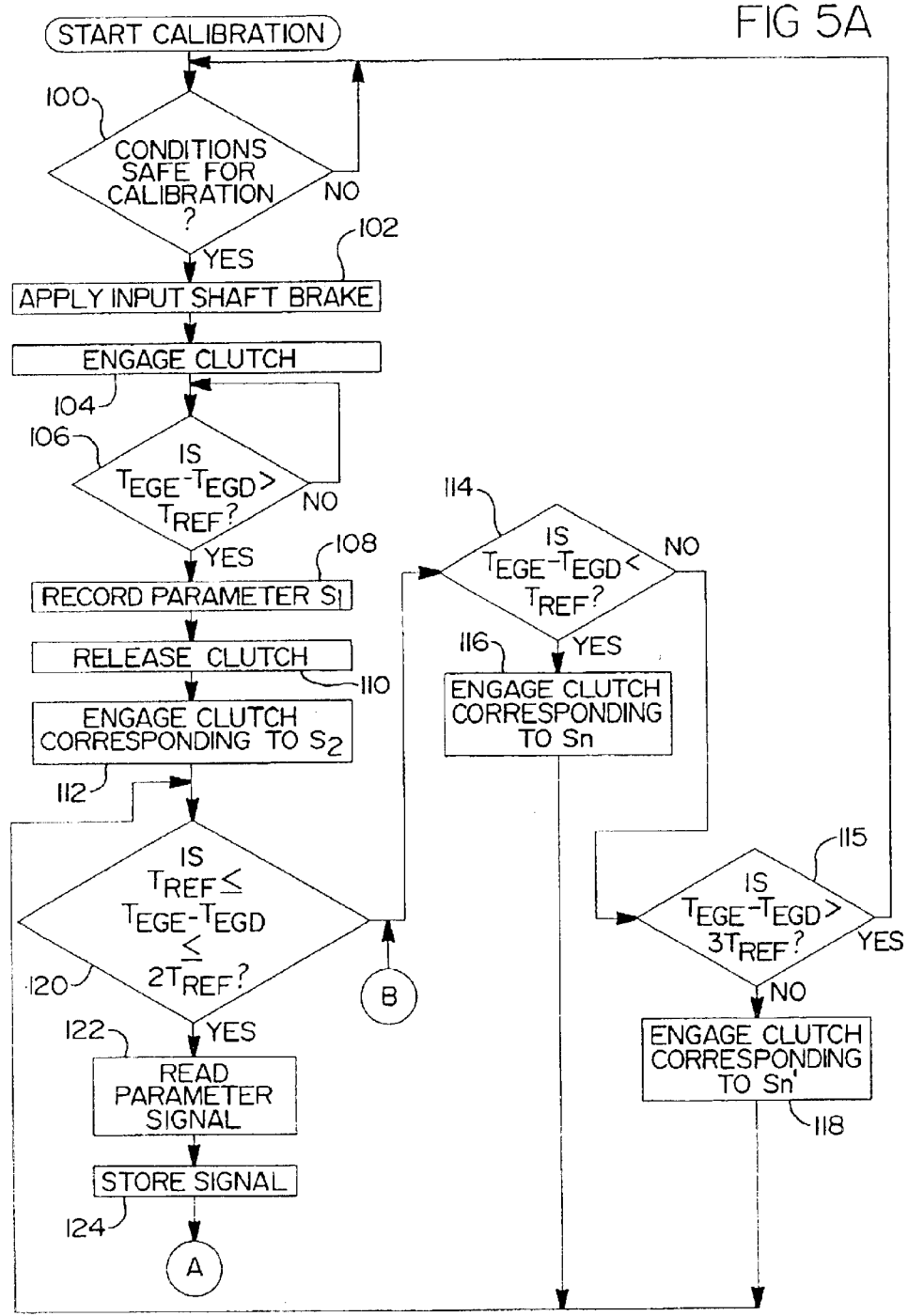

The calibration method of the present invention is described with reference to the flow charts of FIGS. 5A, 5B and 5C. Referring to FIG. 5A, the calibration process begins with the ECU 34 first determining whether certain vehicle conditions are present to commence the calibration, as shown in step 100. The correct vehicle conditions required for entering a calibration state occur, for example, when the vehicle is stationary, the transmission is in neutral, the engine is running, disabling faults such as a J1939 fault are not present, and a minimum coolant temperature level is achieved.

Once the calibration state is entered, ECU 34 starts a calibration timer corresponding to a predetermined maximum calibration period. Should the duration of the calibration period exceed the predetermined maximum calibration period, the calibration will be deemed to have failed and the calibration process will not restart until the next pre-scheduled calibration, such as the next vehicle power up. ECU 34 is programmed to refer to a previously stored PWM control signal value to control actuation of clutch 14 in the event the calibration fails.

The engine controller 28 will first maintain engine speed at a desired idle RPM (about 600–850 RPM) with clutch 14 fully disengaged. The engine torque data is transmitted via the J1939 data link from the engine to the calibration processor 62, where it is filtered, e.g., averaged, to determine a gross disengaged (unloaded) engine torque ($T_{EGD}$). In this state, the amount of torque generated by the engine ($T_{EGD}$) will be equal to that of the engine torque losses ($T_L$) at the desired idle RPM. The gross disengaged engine torque ($T_{EGD}$) is preferably characterized as a percentage (%) of the rated engine reference torque. For example, if the engine torque losses ($T_L$) are equal to 68 lb-ft and the engine reference torque is equal to 680 lb-ft, the gross disengaged engine torque ($T_{EGD}$) will be 10%.

Referring to step 102, the ECU 34 then turns on inertia brake 66 to lock input shaft 20 and, thus, ground the driven side 14B of clutch 14 in order to load the engine. ECU 34 then determines an approximate value of a PWM control signal ($S_1$) that causes clutch 14 to transfer a predetermined amount of torque from engine 12 to transmission 16. Referring to step 104, ECU 34 provides a command output signal to pressure controller 54 instructing pressure controller 54 to provide a ramping PWM control signal to the solenoid-actuated hydraulic system 52 causing clutch 14 to engage in a stepwise manner. The initial value of the ramping PWM control signal preferably corresponds to a [touch point] pre charge position of the clutch, i.e. [the point where the clutch first starts transmitting torque] the point where the hydraulic system just begins to develop pressure. In a preferred embodiment, the PWM control signal is preferably ramped at a rate of approximately 4 mA per 350 mS and the predetermined amount of torque transferred from engine 12 to transmission 16 is about 35 lb-ft (47.5 Nm). Although it has been determined that about 35 lb-ft (47.5 Nm) is the preferred amount of torque transfer to allow urge-to-move operation of the vehicle, it is recognized that an urge-to-move torque in the range of approximately 20–60 lb-ft (27.1–54.3 Nm) may be used. It is also recognized that other ramping rates may be employed to engage the clutch.

As clutch 14 is engaged, the gross engaged (loaded) engine torque ($T_{EGE}$) is continuously being monitored and filtered, e.g. averaged, by the engine and calibration processor 62. The gross engine torque ($T_{EGE}$) is preferably characterized as a percentage (%) of the engine reference torque. The clutch 14 is engaged until the maximum filtered gross engine torque ($T_{EGE}$) sensed during the ramping process minus the gross disengaged engine torque ($T_{EGD}$) is greater than an urge-to-move reference torque ($T_{REF}$), as shown in step 106. The urge-to-move reference torque ($T_{REF}$) is defined in ECU 34 as a percentage (%) of the engine reference torque required to transfer the predetermined amount of torque, e.g. 35 lb-ft (47.5 Nm), from engine 12 to transmission 16. For example, if the engine reference torque is 680 lb-ft (922.8 Nm), the urge-to-move reference torque ($T_{REF}$) would be equal to 5.14% (680 lb-ft×5.14%=35 lb-ft). Alternatively gross engaged engine torque ($T_{EGE}$), gross disengaged engine torque ($T_{EGD}$) and urge-to-move reference torque ($T_{REF}$) may be expressed as an actual torque value, not as a percentage of the engine reference torque.

The ramping engagement of clutch 14 is chosen to provide an approximate measurement of first PWM control signal ($S_1$). The first PWM control signal ($S_1$) is then recorded, step 108, clutch 14 is returned to the fully disengaged position, step 110. While clutch 14 is disengaged, and preferably during future periods of disengagement, the ECU 34 monitors and filters the engine torque data for a predetermined amount of time to account for any engine accessories, such as an air conditioning compressor, that may have been activated and would effect the gross disengaged engine torque ($T_{EGD}$). Once the gross disengaged engine torque ($T_{EGD}$) is re-determined, a more detailed search is commenced to find a more accurate PWM control signal that generates the urge-to-move reference torque ($T_{REF}$).

The detailed search is characterized by re-applying clutch 14 in at least one pulse, where the pulse comprises applying clutch 14 to a position corresponding to a PWM control signal, pausing a predetermined amount of time to allow engine 12 and clutch 14 to stabilize, and then releasing clutch 14. The PWM control signal corresponding to a first pulse is determined by offsetting the recorded first PWM control signal ($S_1$) a predetermined amount, for example 8 mA, to generate a second PWM control signal ($S_2$). Referring to step 112, the clutch 14 is then pulsed corresponding to the second PWM control signal ($S_2$) and the maximum filtered gross engine torque ($T_{EGE}$) sensed during the pulse is recorded.

Referring to steps 114 and 116, if ECU 34 determines that the maximum filtered gross engine torque ($T_{EGE}$) minus the gross disengaged engine torque ($T_{EGD}$) is less than the urge-to-move reference torque ($T_{REF}$), clutch 14 is disengaged and then re-engaged corresponding to a new pulse PWM control signal ($S_n$) that equals the previous PWM control signal ($S_{n-1}$) plus a predetermined amount, for example 1 mA. If it is determined that the maximum filtered gross engine torque ($T_{EGE}$) minus the gross disengaged engine torque ($T_{EGD}$) is greater than three (3) times the urge-to-move reference torque ($T_{REF}$), as shown in step 115, the calibration process is restarted. If, however, it is determined that the maximum filtered gross engine torque ($T_{EGE}$) minus the gross disengaged engine torque ($T_{EGD}$) is greater than two (2) times the urge-to-move reference torque but less than or substantially equal to three (3) times the urge-to-move reference torque ($T_{REF}$), clutch 14 is disengaged and then re-engaged corresponding to a new pulse PWM control signal ($S_{n'}$) that equals the previous PWM control signal ($S_{n'-1}$) minus a predetermined amount, for example 2 mA, as shown in step 118. Referring to step 120, the cycle of applying and releasing clutch 14 is continued until the filtered gross engine torque ($T_{EGE}$) minus the gross disengaged engine torque ($T_{EGD}$) is greater than or substantially equal to the urge-to-move reference torque ($T_{REF}$) and less than or substantially equal to two (2) times the urge-to-move reference torque ($T_{REF}$). The corresponding PWM control signal is then read (step 122) and stored in computer memory (step 124).

Referring to FIG. 5B, once a more accurate PWM control signal is identified, the calibration process enters a confirmation state to verify that when the identified PWM control signal is applied to solenoid valve 52, the urge-to-move reference torque ($T_{REF}$) is achieved. Referring to step 126, clutch 14 is applied to a position corresponding to the identified PWM control signal and the maximum filtered gross engine torque ($T_{EGE}$) is recorded. Referring to step 128, if it is determined that the maximum filtered gross engine torque ($T_{EGE}$) minus the gross disengaged torque ($T_{EGD}$) is [not greater] less than or substantially equal to the urge-to-move reference torque ($T_{REF}$) or [less] greater than or substantially equal to two (2) times the urge-to-move reference torque ($T_{REF}$), the confirmation is deemed to have failed and clutch 14 is disengaged and then re-engaged in at least one pulse, as described above, to determine a more accurate PWM control signal. Otherwise, the confirmation process proceeds until the PWM control signal is verified a predetermined number of times, for example twice, and the verified PWM signal is stored in computer memory, as shown in steps 130 and 132.

Referring to FIG. 5C, in order to account for control system inaccuracies, such as inaccuracies in engine torque reporting, ECU 34 subtracts a stored predetermined offset constant from the verified PWM signal to arrive at a PWM control signal ($S_{UTM}$) that corresponds to the urge-to-move position of clutch 14, as shown in step 134. In a preferred embodiment, the ECU 34 subtracts a predetermined offset constant of 16 mA, which is empirically determined from a wide range of vehicle drive line configurations. The PWM control signal ($S_{UTM}$) is then stored in non-volatile memory for future reference.

Due to factors such as clutch wear and temperature changes, the urge-to-move PWM control signal ($S_{UTM}$) can vary, and therefore is updated during each calibration. Referring to steps 136 and 138, in order to allow new clutch control systems to calibrate quickly, if it is determined that the current PWM control signal ($S_{UTM}$) differs from the previously stored PWM control signal ($S^{UTM}$-1) by more than a predetermined amount, for example 20 mA, the new value is used by ECU 34 unfiltered. Otherwise, a "filter" is employed by ECU 34, which calculates the PWM control signal ($S_{UTM}$) as a function of the current PWM control signal ($S_{UTM}$) and the previously stored PWM control signal ($S_{UTM}$-1), as shown in step 140. In a preferred embodiment, ECU 34 utilizes approximately 80% of the stored PWM control signal ($S_{UTM}$-1) and approximately 20% of the current PWM control signal ($S_{UTM}$) to determine an updated PWM control signal to be used by the control system to modulate clutch 14 to the urge-to-move position. The use of a filter advantageously reduces the susceptibility of changes in PWM control signal ($S_{UTM}$) and the corresponding urge-to-move position of clutch 14 due to noise in the electronics of control system 60.

Referring to steps 142 and 144, the updated urge-to-move PWM control signal is then stored in non-volatile memory for future access by ECU 34 and ECU 34 releases brake 66 to complete the calibration process. The clutch control parameter value ($S_{UTM}$) is utilized by ECU 34 to control reengagement of the automated clutch 14 while transmission 16 is in the "urge to move" mode.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A control system for a vehicular drive-line system that includes a friction clutch drivingly interposed between a prime mover and a transmission, the control system comprising:

a first input used to generate an unloaded prime mover torque value;

a second input used to generate a loaded prime mover torque value;

a third input representing a clutch control parameter signal;

a processor for comparing the unloaded prime mover torque to a loaded prime mover torque; and at least one output used to apply the friction clutch until the difference between the loaded prime mover torque and the unloaded prime mover torque is substantially equal to or greater than an urge-to-move reference torque.

2. The control system of claim 1, wherein the urge-to-move reference torque is a percentage of the rated engine reference torque required to transfer a predetermined amount of torque from the prime mover to the transmission.

3. The control system of claim 1, wherein:

the third input represents a first clutch control parameter signal when the difference between the loaded prime mover torque and the unloaded prime mover torque is substantially equal to or greater than an urge-to-move reference torque;

the at least one output is further used to apply the clutch in at least one pulse until the difference between the loaded prime mover torque and the unloaded prime mover torque is substantially equal to or greater than the urge-to-move reference torque and less than or substantially equal to two times the urge-to-move reference torque; and the third input represents a second clutch control parameter signal when the difference between the loaded prime mover torque and the unloaded prime mover torque is substantially equal to or greater than the urge-to-move reference torque and less than or substantially equal to two times the urge-to-move reference torque.

4. The control system of claim 1, wherein the friction clutch includes a solenoid-controlled valve and a source of pulse width-modulated electric power applied to the solenoid of the valve, the clutch control parameter signal comprising the pulse width modulation of the electric power.

5. A method for controlling a vehicular drive line system including a friction clutch drivingly interposed between an engine and a transmission, the method comprising the steps of:

determining an unload engine torque value;

applying the clutch until the difference between a loaded engine torque and the unloaded engine torque is substantially equal to or greater than an urge-to-move reference torque;

sensing a clutch control parameter signal when the difference between the loaded engine torque and the unloaded engine torque is substantially equal to or greater than the urge-to-move reference torque, wherein the step of applying the clutch is further defined by applying the clutch in at least one pulse until the difference between the loaded engine torque and the unloaded engine torque is substantially equal to or greater than the urge-to-move reference torque, and wherein the step of sensing the clutch control parameter signal is further defined by sensing a clutch control parameter signal when the difference between the loaded engine torque and the unloaded engine torque is substantially equal to or greater than the urge-to-move reference torque and less than or substantially equal to two times the urge-to-move reference torque.

6. The method of claim 5, wherein the steps of applying the clutch and sensing the clutch control parameter signal are further defined by:

applying the clutch until the difference between the loaded engine torque and the unloaded engine torque exceeds the urge-to-move reference torque;

sensing a first control parameter signal when the difference between the loaded engine torque and the unloaded engine torque exceeds the urge-to-move reference torque, and then releasing the clutch;

applying the clutch in at least one pulse until the difference between the loaded engine torque and the unloaded engine torque is substantially equal to or greater than the urge-to-move reference torque and less than or substantially equal to two times the urge-to-move reference torque; and sensing a second clutch control parameter signal when the difference between the loaded engine torque and the unloaded engine torque is substantially equal to or greater than the urge-to-move reference torque and less than or substantially equal to two times the urge-to-move reference torque.

7. The method of claim 6, wherein the pulse corresponds to the first control parameter signal minus a predetermined offset.

8. The method of claim 6, wherein the pulse corresponds to a control parameter signal used in a preceding pulse plus a predetermined amount if the difference between the loaded engine torque and the unloaded engine torque is less than the urge-to-move reference torque.

9. The method of claim 6, wherein the pulse corresponds to a control parameter signal used in a preceding pulse minus a predetermined amount if the difference between the loaded engine torque and the unloaded engine torque is greater than approximately two times the urge-to-move reference torque but less than approximately three times the urge-to-move reference torque.

10. The method of claim 5, further including the step of offsetting the clutch control parameter signal a predetermined amount to determine a clutch control parameter signal corresponding to an urge-to-move position of the master friction clutch.

* * * * *